Aug. 21, 1934.    B. T. BROOKS    1,970,687
ART OF MAKING SULPHATED DERIVATIVES OF BUTENE
Filed Jan. 6, 1930
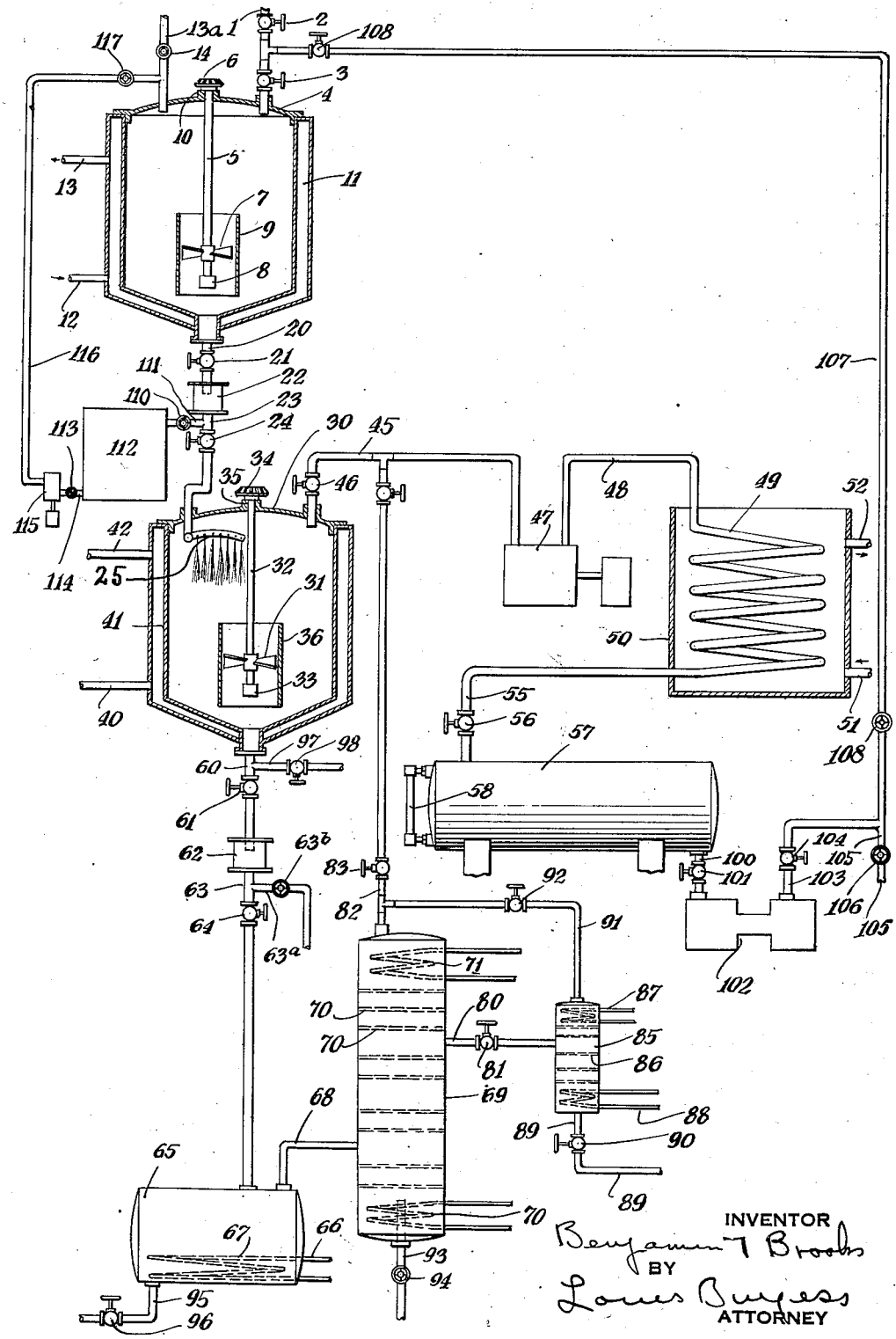
INVENTOR
Benjamin T Brooks
BY
Louis Burgess
ATTORNEY

UNITED STATES PATENT OFFICE 1,970,687

ART OF MAKING SULPHATED DERIVATIVES OF BUTENE

Benjamin T. Brooks, Stamford, Conn., assignor, by mesne assignments, to Standard Alcohol Company, Wilmington, Del., a corporation of Delaware Application January 6, 1930, Serial No. 418,883

6 Claims. (Cl. 260—99.12)

This invention relates to the art of manufacturing sulphated derivatives of butene, and more specifically to the art of manufacturing butyl alcohol by sulphation of butene and hydrolysis of the butyl sulphate so produced. It comprises a method for increasing the yield of butyl alcohol from any given quantity of raw material, for increasing the acid efficiency, and/or for obtaining a proportion of the original raw material in a purified and more valuable condition.

A favored method for manufacturing butyl alcohol comprises separating from cracked petroleum material, such as the normally gaseous constituents of highly cracked petroleum, a fraction consisting predominantly of compounds containing 4 atoms to the molecule. Such a cut is preferably obtained from the normally gaseous constituents resulting from vapor phase cracking of petroleum oils carried out, for example, at temperatures between 1000 and 1200° F. Such a cut may, for example, contain isobutene, butene 1, and erythrene.

This cut is treated in liquid phase with aqueous sulphuric acid ranging in concentration from 60 to 80% $H_2SO_4$, and the treatment is preferably carried out at temperatures ranging from 60 to 95° F. By appropriate control of the reaction, for example, by using relatively dilute acid within the aforementioned range at relatively low temperatures the acid may be caused to react selectively on the isobutene present in the raw material, and the acid may be caused to absorb the isobutene selectively forming tertiary butyl sulphate. Such an acid phase contains mono-alkyl sulphates and will be hereinafter referred to as an acid liquor. This acid liquor may be separated from unreacted olefine material by stratification and separately withdrawn leaving the unreacted olefine material for further appropriate treatment. This selective removal of isobutene may, for example, be accomplished by the use of acid of 60 to 68% $H_2SO_4$ content at temperatures below 70° F.

By the employment of stronger acid, preferably at higher temperatures, the reaction may be made to proceed further, substantial quantities of butene 1 being absorbed by the acid. Such treatment may be carried out on the original raw material, but is preferably applied to a raw material which has been preliminarily treated as above described for the removal of the isobutene originally present. In either case, the acid liquor may be separated by stratification from the remaining hydrocarbon material containing polymerized hydrocarbons and unreacted butene, and this acid liquor may be separately withdrawn. Preferably, however, after such treatment a mixture comprising acid liquor and hydrocarbons consisting largely of polymerized olefines not in solution in the said acid liquor is withdrawn from the treater. This last mentioned material contains acid liquor and will be hereinafter referred to as an acid reaction mixture.

I have discovered that the acid reaction mixture and the acid liquor hereinbefore referred to, may be made to yield relatively large quantities of highly purified butene and that by separating and reacting on this butene the yield of butyl alcohol from any given quantity of raw material may be substantially increased. If desired, the recovered butene by reason of its superior quality may be put to other advantageous uses, and a preferred method of utilizing it will be hereinafter described.

It has not heretofore been realized that the acid reaction mixture and acid liquor herein described could be made to yield substantial quantities of purified butene or that the yield of alcohol in the process and the operating efficiency of the process could be substantially enhanced by recovering butene from the said acid reaction products and the appropriate treatment of the same. I have found that this condition exists to a relatively great extent even where olefine material has been commercially subjected to prolonged treatment with a quantity of aqueous sulphuric acid stoichiometrically sufficient to convert all of the contained butenes to mono-butyl sulphates.

Referring to the drawing which is a diagrammatic vertical elevation of apparatus in which my invention may be carried into effect, a quantity of olefine material may be introduced through pipe 1, controlled by valves 2 and 3 to autoclave 4. A suitable raw material for this purpose may, for example, contain approximately the following percentages of the constituents enumerated:

|   | Per cent |
|---|---|
| Erythrene | 15–20 |
| Isobutene | 15–30 |
| Normal butene | 45–65 |

Autoclave 4 is adapted to operate at pressures in excess of atmospheric and is provided with a mixing device consisting of propeller shaft 5, actuated by the bevel gear 6, operating to drive the propeller 7. The lower end of shaft 5 is seated in bearing 8, and draft tube 9 surrounds propeller 7. Propeller shaft 5 enters autoclave 4 through stuffing box diagrammatically indicated by 10. Suitable means is preferably provided for artificially cooling autoclave 4, such as, for example, a cooling coil or a double jacket 11, to which a refrigerating liquid may be introduced by means of pipe 12, while the vaporized proportions of said liquid may be withdrawn through pipe 13. When autoclave 4 has been charged with a suitable quantity of the said raw material, the supply of refrigerating liquid e. g., ammonia, or sulphur dioxid is so regulated as to hold approximately a predetermined temperature, and a quantity of aqueous sulphuric acid is gradually introduced by means of pipe 13$^a$ controlled by valve 14. With the raw material hereinbefore mentioned, I prefer to complete the acid treatment in two successive installments, for example, the quantity of acid first employed may volumetrically be approximately 25% of the volume of the hydrocarbon material, and may have an acid concentration between 60 and 70%, preferably between 62 and 66%. In the practical example herein referred to, the concentration of acid employed is 63%.

The acid is gradually introduced, care being taken by manipulation of the supply of refrigerant to keep the temperature of reaction comparatively low, say between 60 and 65° F. When the treatment is finished the operation of the agitating device is stopped and the material in the autoclave permitting to stratify for a period of approximately two hours. The lower layer consisting of acid liquor and containing a relatively large quantity of alkyl sulphate derived from isobutene is separately withdrawn through pipe 20, controlled by valve 21, until observations made at look-box 22 indicate that substantially the total quantity of acid liquor has been removed from autoclave 4. The acid liquor passes through pipe 23, controlled by valve 24, into distributor 25, by which it is dispersed in the form of fine streams into autoclave 30. This autoclave was preliminarily charged with a quantity of water, viz., approximately three volumes of water for one volume of acid added. During the introduction of the acid liquor the water is kept in vigorous agitation by means of propeller 31, actuated by shaft 32. The lower end of shaft 32 is retained in bearing 33 and the upper end is keyed to bevel gear 34. Shaft 32 enters autoclave 30 through the stuffing box diagrammatically indicated as 35. Propeller 31 is surrounded by draft tube 36.

The agitation device is maintained in continuous operation during the period that acid reaction product is commingled with water in autoclave 30, and during this period refrigerating liquid is preferably introduced through pipe 40 to double walled jacket 41 of autoclave 30, while vaporized refrigerant passes off through pipe 42. The quantity of refrigerant is preferably so regulated as to keep the temperature of the material in autoclave 30 below 60° F.

During this dilution operation, relatively pure butene contained in the acid liquor product is evolved and passes off through pipe 45, controlled by valve 46, to pump 47 by which it is compressed and forced through pipe 48 and condenser 49. Condenser 49 may be of any suitable type, such as a coil submerged in condenser box 50 supplied with cooling liquid through pipe 51. Any overflow may pass off from condenser box 50 through pipe 52. A spray cooler or any other type may alternatively be employed. The pressure generated by pump 47 is sufficient to liquefy the recovered butene in coil 49, and the liquefied butene passes through pipe 55, controlled by valve 56, into storage tank 57. This tank is preferably provided with sight gage such as 58 by means of which the level of liquid therein may be observed.

As soon as the mixing operation is complete the agitation is discontinued and the liquid in autoclave 30 is diverted through pipe 63$^a$ controlled by valve 63$^b$ for conversion into tertiary butyl alcohol or utilization in any desired manner.

The hydrocarbon material remaining in autoclave 4 comprising normal butene, substantially free from isobutene, is then treated with a further quantity of sulphuric acid, preferably of higher concentration. This may, for example, be sulphuric acid of 70 to 80% concentration. In the particular example, I subject the remaining hydrocarbon material in 4 to 72% sulphuric acid equivalent to one half of the volume of hydrocarbon material originally charged to agitator 4. The sulphuric acid is gradually introduced, care being taken during this stage by manipulation of the refrigerant supplied through pipe 12 to hold the temperature of the reacting materials between 70 and 80° F., a temperature of 70 to 75° being preferred. The agitation is continued for a period of two or three hours after the complete introduction of the sulphuric acid. The acid reaction mixture in autoclave 4 is then withdrawn through pipe 20 and dispersed by means of spray head 25 in autoclave 30. This autoclave has been preliminarily filled with water equivalent to two volumes for each volume of acid added. The agitation device in autoclave 30 is operated during the period that acid reaction product and water are being commingled, and refrigerant is introduced through pipe 40 to the jacket surrounding the autoclave in quantity sufficient to keep the temperature from becoming excessive, preferably in quantity sufficient to hold the temperature of the material in autoclave 30 below 60° F.

Butene is evolved in substantial quantity during this dilution operation, and passes off through pipe 45 to be compressed by pump 47, cooled and liquefied in coil 49, and then stored in tank 57. At the expiration of the dilution operation, agitator in autoclave 30 is stopped and the mixture therein permitted to settle until stratification is substantially complete. The lower aqueous phase is then withdrawn through pipe 60 and transferred to still 65.

The upper layer consisting largely of polymerized hydrocarbons may, if desired, be held in autoclave 30 and warmed by introducing steam to the jacket of this autoclave to separate the last traces of butene therefrom. The butene so recovered being taken off overhead through pipe 45 to be liquefied and added to the butene stored in tank 57. This hydrocarbon material may then be diverted from the system for utilization in any desired manner through pipe 63$^a$ controlled by valve 63$^b$. The step of warming this polymerized hydrocarbon material in autoclave 30 may, of course, be omitted if desired.

The aqueous phase which was transferred to still 65 is distilled in 65 and the vapors evolved pass through vapor outlet 68 into fractionating column 69. A cut of secondary butyl alcohol is taken off from column 69, through side outlet 80. A further quantity of butene is simultaneously disengaged and passes off through pipe 82, discharging into pipe 45, to be subsequently compressed, liquefied, and stored.

Any butene in the secondary butyl alcohol may be stripped by the use of column 85 and diverted through pipe 91 into pipe 45 for liquefaction and storage. Secondary butyl alcohol is withdrawn from the system through pipe 89. Bottoms from tower 69 are withdrawn through pipe 93, and at the expiration of the distillation operation dilute sulphuric acid is withdrawn from still 65 through pipe 95 for concentration and reuse.

The butene so separated and recovered may be equivalent to a very substantial proportion of the raw material originally treated and not infrequently is equal to 30 to 40% of the same. This recovered material is substantially purified containing a much less quantity of isobutene and erythrene than the charged stock. The recovered material frequently runs 90% or more of normal butene. This recovered material may be withdrawn from tank 57, by pipe 100, controlled by valve 101, and diverted through pump 102 and pipe 103, controlled by valve 104, to be withdrawn from the system through pipe 105, controlled by valve 106 for other uses if desired, or may alternatively be passed through pipe 107, controlled by valve 108, back into autoclave 4 for conversion into sulphated derivatives.

The recovered butene may be treated separately or may be combined with succeeding batches of raw material of the type from which it is derived. I prefer however, to add a quantity of the recovered butene to each succeeding batch of olefine material, and this quantity is preferably substantially equal to the quantity of butene recovered from corresponding batch of raw material. This restoral of butene to the raw material is preferably made after completion of the first acid treatment hereinbefore described and after removal of the acid liquor resulting from this treatment. In this way, I avoid contaminating the recovered material with substantial quantities of isobutene and minimize the difficulty of selectively removing the isobutene from the raw material. By adding the recovered butene to the olefine material and after completion of the preliminary acid treatment referred to, I am enabled to carry out a true cyclic operation with substantial economies and a considerable increase in operative efficiency. By conducting the operation in this manner and recycling the recovered butene, I am further enabled to operate with acid of a lesser concentration and/or quantity than could otherwise be economically employed and to either avoid polymerization during the treatment or increase the efficiency per unit of acid employed, or both. In particular, when operating this cycle I find it desirable to operate with less acid than is stoichiometrically required to combine with all the butene subjected to treatment with the formation of monobutyl sulphates, and I find that in this way the ratio of butyl alcohol produced to acid consumed is materially increased.

I find it of further advantage, instead of conducting the acid reaction products hereinbefore described directly through the operations adapted to produce alcohols and butene therefrom, to separate all or part of the acid liquor and contact the separated acid liquor with butene recovered from previous batches. In this way, I am enabled to cause the separated acid liquor to react additionally with the recovered butene with a consequent increase in acid efficiency. This effect may be due to the fact that the recovered butene contains a relatively greater concentration of secondary butenes than the olefine material from which the acid liquor was derived. The acid liquor after such contact is then conducted through the operations hereinbefore described, adapted to recover butene and produce butyl alcohol therefrom. I may also take this acid liquor and instead of contacting it with purified butene, contact it with olefine material containing butene and erythrene such as hereinbefore described, which has been fortified and enriched by adding thereto purified butene recovered from previous batches. This acid liquor may then be settled out and so separated, and thereafter subjected to treatment for the recovery of butene and production of butyl alcohol therefrom.

In case the acid liquor is recycled by either of the methods just described, butene is simultaneously recovered from hydrocarbon material which is not in solution in the acid liquor and/or from acid liquor which is not recycled; as the recycled acid liquor combines with part of the butene and only a part of that contacted with the acid liquor is recovered as uncombined butene. The amount chemically combined corresponds in quantity to that recovered from other sources than recycled acid liquor.

In accordance with my preferred procedure, the olefine material remaining in autoclave 4 after completion of the preliminary treat with weak sulphuric acid is subjected to treatment with stronger sulphuric acid as hereinbefore described. Instead of drawing off the entire reaction mixture, I permit this material in autoclave 4 to settle until a part of the acid liquor has separated as a lower layer and then withdraw all or part of this separated acid liquor. This acid liquor is withdrawn through pipe 111, controlled by valve 110, into tank 112, in which it is retained for a time. The balance of the acid reaction mixture is then processed as hereinbefore explained.

A quantity of butene recovered from previous batches is then charged to autoclave 4 and the acid liquor from tank 112 is withdrawn through pipe 114, controlled by valve 113, and forced by pump 115, through pipe 116, controlled by valve 117, into autoclave 4 in which it is admixed with the charge of recovered butene. Fresh acid may be added at this stage. After mixing the butene and acid liquor the mixture is settled, the acid liquor is separated and worked up for butene and butyl alcohol in the manner hereinbefore described for processing the acid liquor from the second acid treatment.

The foregoing specific description of my method represents only the preferred way of carrying my invention into effect and is given for purposes of illustration and not by way of limitation. It is my intention that the invention be limited only by the appended claims or their equivalents in which I have endeavored to claim broadly all inherent novelty.

I claim:

1. Process of treating olefine material consisting predominantly of butenes and erythrene, which comprises sulphating butene contained in said olefine material by reacting said material in liquid phase and under pressure in excess of atmospheric with aqueous sulphuric acid of a concentration adapted to form an acid reaction mixture containing mono-butyl sulphate, and separating butene from said acid reaction mixture.

2. Process according to claim 1 in which the olefine material contains isobutene and butene 1, and the isobutene is selectively removed from the olefine material before the sulphation of the butene 1.

3. Process of treating olefine material consisting predominantly of butene and erythrene, which comprises sulphating butene contained in successive batches of said olefine material by reacting said batches in liquid phase and under pressure in excess of atmospheric with aqueous sulphuric acid of a concentration adapted to form acid reaction mixtures, separating butene from said acid reaction mixtures, restoring the butene so separated to succeeding batches of olefine material undergoing reaction with aqueous sulphuric acid, and continuing the reaction with aqueous sulphuric acid on succeeding batches of olefine material containing butene added thereto recovered from acid reaction mixtures derived from preceding batches.

4. Process according to claim 3 in which the olefine material contains isobutene and butene 1, and the isobutene is separated from the successive batches of olefine material before the sulphation of the butene 1.

5. Process of treating olefine material consisting predominantly of butenes and erythrene, which comprises sulphating butene in successive batches of said olefine material by reaction of said batches in liquid phase and under pressure in excess of atmospheric with aqueous sulphuric acid of a concentration adapted to form acid sulphates of butene, forming successive batches of said reaction mixtures, containing acid liquor and hydrocarbon material not in solution in said acid liquor, separating at least a part of the acid liquor from said acid reaction mixtures, recovering butene from the unseparated portion of said acid reaction mixtures, and contacting the separated acid liquor with butene recovered from said acid reaction mixtures.

6. Process according to claim 5 in which the olefine material contains isobutene and butene 1, and the amount of aqueous sulphuric acid applied to said batches when sulphating butene 1 contained therein is stoichiometrically less than would be required to convert all the butenes contained in the material treated to mono-butyl sulphate.

BENJAMIN T. BROOKS.